US012628164B2

(12) United States Patent
Sarkis et al.

(10) Patent No.: US 12,628,164 B2
(45) Date of Patent: May 12, 2026

(54) SIDELINK TRANSMISSIONS USING SLOT AGGREGATION

(71) Applicant: QUALCOMM Incorporated, San Diego, CA (US)

(72) Inventors: Gabi Sarkis, San Diego, CA (US); Guangyi Liu, San Diego, CA (US); Tien Viet Nguyen, Bridgewater, NJ (US); Kapil Gulati, Belle Mead, NJ (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 17/805,799

(22) Filed: Jun. 7, 2022

(65) Prior Publication Data

US 2023/0397207 A1 Dec. 7, 2023

(51) Int. Cl.
*H04W 72/00* (2023.01)
*H04W 72/0446* (2023.01)
*H04W 72/20* (2023.01)

(52) U.S. Cl.
CPC ....... *H04W 72/20* (2023.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 2021/0006318 A1* | 1/2021 | Kim | ...................... | H04L 1/1867 |
| 2021/0243796 A1* | 8/2021 | Panteleev | ............. | H04W 74/08 |
| 2021/0400681 A1* | 12/2021 | Wang | ................... | H04L 5/0055 |
| 2022/0167315 A1* | 5/2022 | Park | ................. | H04W 72/0446 |
| 2022/0255680 A1* | 8/2022 | Moon | ................ | H04L 1/1664 |
| 2022/0279558 A1* | 9/2022 | Zhang | ................ | H04W 72/566 |
| 2022/0330261 A1* | 10/2022 | Yeo | ................... | H04W 72/543 |
| 2022/0338222 A1* | 10/2022 | Kim | ................. | H04W 72/1273 |
| 2022/0346118 A1* | 10/2022 | Wu | ........................ | H04L 5/0044 |
| 2023/0354429 A1* | 11/2023 | Niu | ................. | H04W 74/0808 |
| 2024/0080805 A1* | 3/2024 | Lee | ................. | H04W 72/0446 |
| 2024/0188001 A1* | 6/2024 | Su | ........................ | H04W 52/146 |
| 2024/0244581 A1* | 7/2024 | Esswie | ............... | H04W 68/005 |

FOREIGN PATENT DOCUMENTS

| | | | | | |
|---|---|---|---|---|---|
| CN | 111355567 A | * | 6/2020 | ........... | H04W 72/56 |
| WO | WO-2023023903 A1 | * | 3/2023 | | |

* cited by examiner

*Primary Examiner* — Brandon M Renner
(74) *Attorney, Agent, or Firm* — Harrity & Harrity LLP

(57) ABSTRACT

Various aspects of the present disclosure generally relate to wireless communication. In some aspects, a first user equipment (UE) may transmit, to a second UE, a sidelink transmission that spans multiple aggregated slots, wherein a first symbol in a slot of the sidelink transmission enables a decoding of the sidelink transmission by the second UE. The first UE may receive, from the second UE, a response based at least in part on the sidelink transmission that spans the multiple aggregated slots. Numerous other aspects are described.

30 Claims, 10 Drawing Sheets

500 →

PSCCH    PSSCH

600

710 — Transmit, to a second UE, a sidelink transmission that spans multiple aggregated slots, wherein a first symbol in a slot of the sidelink transmission enables a decoding of the sidelink transmission by the second UE 720 — Receive, from the second UE, a response based at least in part on the sidelink transmission that spans the multiple aggregated slots

700

810 Receive, from a first UE, a sidelink transmission that spans multiple aggregated slots, wherein a first symbol in a slot of the sidelink transmission enables a decoding of the sidelink transmission by the second UE 820 Transmit, to the first UE, a response based at least in part on the sidelink transmission that spans the multiple aggregated slots

800

SIDELINK TRANSMISSIONS USING SLOT AGGREGATION

FIELD OF THE DISCLOSURE

Aspects of the present disclosure generally relate to wireless communication and to techniques and apparatuses for sidelink transmissions using slot aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
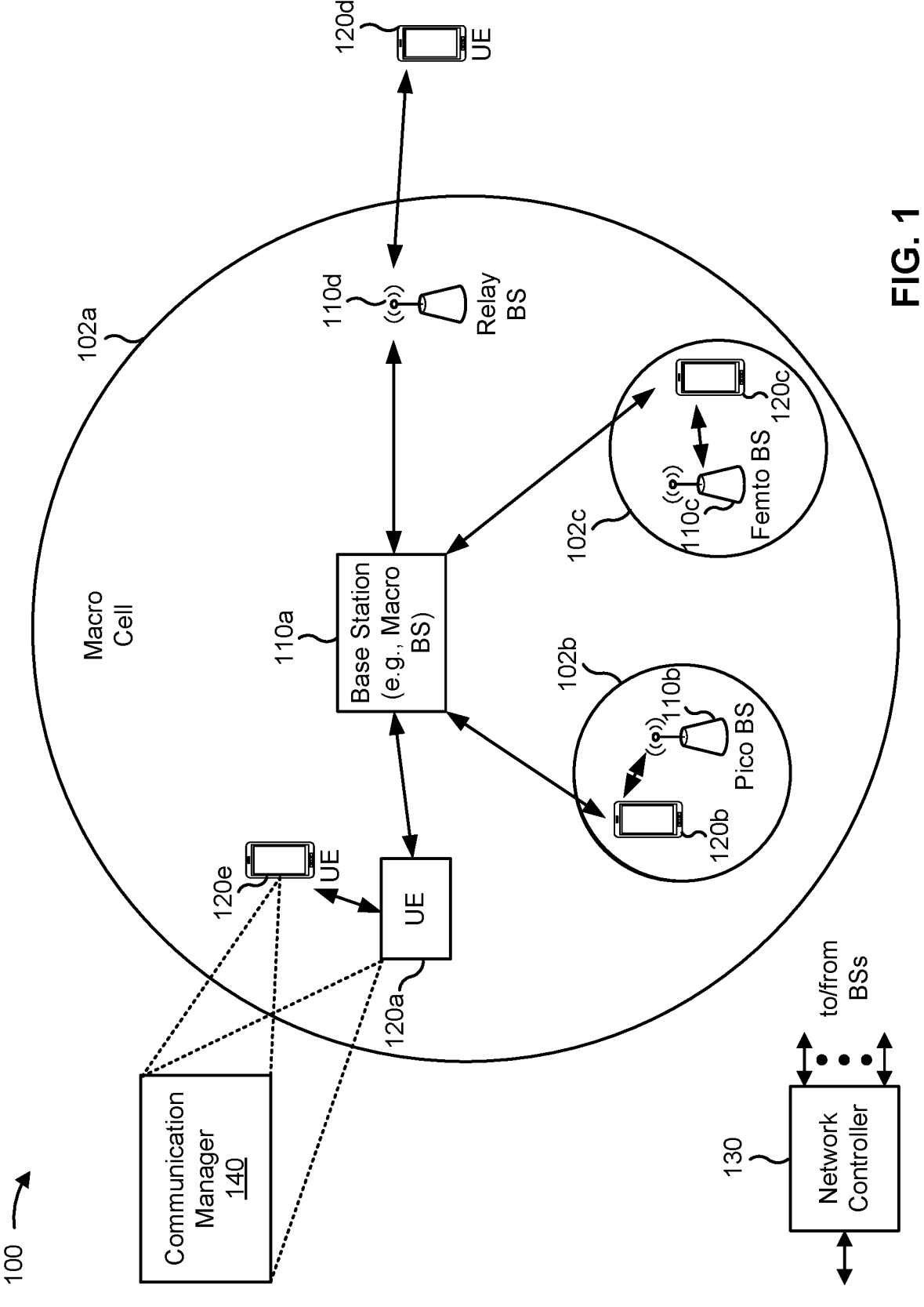
FIG. 1 is a diagram illustrating an example of a wireless network, in accordance with the present disclosure.

In some implementations, an apparatus for wireless communication at a first user equipment (UE) includes a memory and one or more processors, coupled to the memory, configured to: transmit, to a second UE, a sidelink transmission that spans multiple aggregated slots, wherein a first symbol in a slot of the sidelink transmission enables a decoding of the sidelink transmission by the second UE; and receive, from the second UE, a response based at least in part on the sidelink transmission that spans the multiple aggregated slots.

In some implementations, an apparatus for wireless communication at a second UE includes a memory and one or more processors, coupled to the memory, configured to: receive, from a first UE, a sidelink transmission that spans multiple aggregated slots, wherein a first symbol in a slot of the sidelink transmission enables a decoding of the sidelink transmission by the second UE; and transmit, to the first UE, a response based at least in part on the sidelink transmission that spans the multiple aggregated slots.

In some implementations, a method of wireless communication performed by a first UE includes transmitting, to a second UE, a sidelink transmission that spans multiple aggregated slots, wherein a first symbol in a slot of the sidelink transmission enables a decoding of the sidelink transmission by the second UE; and receiving, from the second UE, a response based at least in part on the sidelink transmission that spans the multiple aggregated slots.

In some implementations, a method of wireless communication performed by a second UE includes receiving, from a first UE, a sidelink transmission that spans multiple aggregated slots, wherein a first symbol in a slot of the sidelink transmission enables a decoding of the sidelink transmission by the second UE; and transmitting, to the first UE, a response based at least in part on the sidelink transmission that spans the multiple aggregated slots.

In some implementations, a non-transitory computer-readable medium storing a set of instructions for wireless communication includes one or more instructions that, when executed by one or more processors of a first UE, cause the first UE to: transmit, to a second UE, a sidelink transmission that spans multiple aggregated slots, wherein a first symbol in a slot of the sidelink transmission enables a decoding of the sidelink transmission by the second UE; and receive, from the second UE, a response based at least in part on the sidelink transmission that spans the multiple aggregated slots.

In some implementations, a non-transitory computer-readable medium storing a set of instructions for wireless communication includes one or more instructions that, when executed by one or more processors of a second UE, cause the second UE to: receive, from a first UE, a sidelink transmission that spans multiple aggregated slots, wherein a first symbol in a slot of the sidelink transmission enables a decoding of the sidelink transmission by the second UE; and transmit, to the first UE, a response based at least in part on the sidelink transmission that spans the multiple aggregated slots.

In some implementations, a first apparatus for wireless communication includes means for transmitting, to a second apparatus, a sidelink transmission that spans multiple aggregated slots, wherein a first symbol in a slot of the sidelink transmission enables a decoding of the sidelink transmission by the second apparatus; and means for receiving, from the second apparatus, a response based at least in part on the sidelink transmission that spans the multiple aggregated slots.

In some implementations, a second apparatus for wireless communication includes means for receiving, from a first apparatus, a sidelink transmission that spans multiple aggregated slots, wherein a first symbol in a slot of the sidelink transmission enables a decoding of the sidelink transmission by the second apparatus; and means for transmitting, to the first apparatus, a response based at least in part on the sidelink transmission that spans the multiple aggregated slots.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations

110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., UE 120a) may include a communication manager 140. As described in more detail elsewhere herein, the communication manager 140 may transmit, to a second UE, a sidelink transmission that spans multiple aggregated slots, wherein a first symbol in a slot of the sidelink transmission enables a decoding of the sidelink transmission by the second UE; and receive, from the second UE, a response based at least in part on the sidelink transmission that spans the multiple aggregated slots. Additionally, or alternatively, the communication manager 140 may perform one or more other operations described herein.

In some aspects, a second UE (e.g., UE 120e) may include a communication manager 140. As described in more detail elsewhere herein, the communication manager 140 may receive, from a first UE, a sidelink transmission that spans multiple aggregated slots, wherein a first symbol in a slot of the sidelink transmission enables a decoding of the sidelink transmission by the second UE; and transmit, to the first UE, a response based at least in part on the sidelink transmission that spans the multiple aggregated slots. Additionally, or alternatively, the communication manager 140 may perform one or more other operations described herein.

As indicated above, FIG. 1 is provided as an example. Other examples may differ from what is described with regard to FIG. 1.

Figure 2:
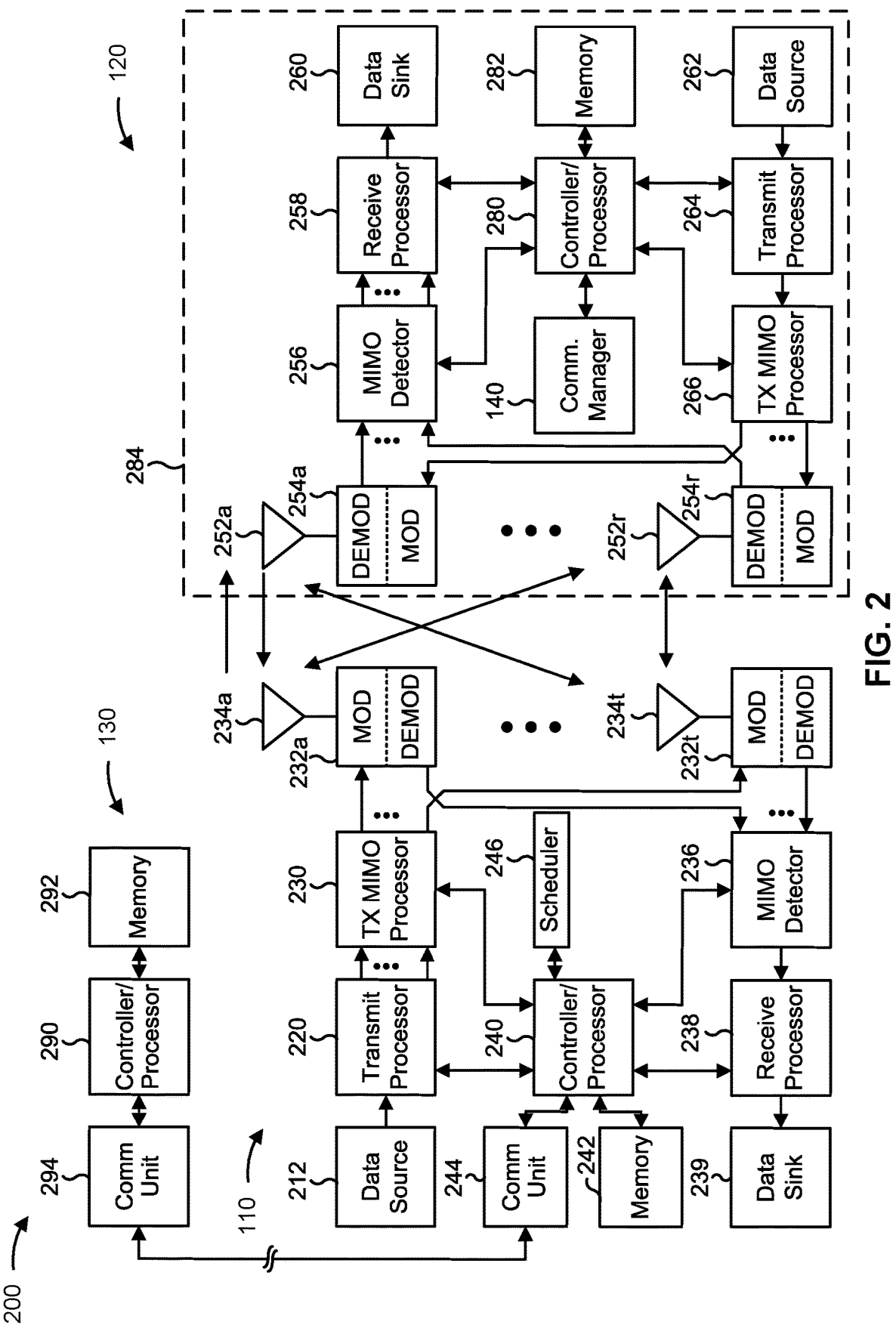
FIG. 2 is a diagram illustrating an example of a base station in communication with a user equipment in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with sidelink transmissions using slot aggregation, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, a first UE (e.g., UE 120a) includes means for transmitting, to a second UE, a sidelink transmission that spans multiple aggregated slots, wherein a first symbol in a slot of the sidelink transmission enables a decoding of the sidelink transmission by the second UE; and/or means for receiving, from the second UE, a response based at least in part on the sidelink transmission that spans the multiple aggregated slots. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., UE 120*e*) includes means for receiving, from a first UE, a sidelink transmission that spans multiple aggregated slots, wherein a first symbol in a slot of the sidelink transmission enables a decoding of the sidelink transmission by the second UE; and/or means for transmitting, to the first UE, a response based at least in part on the sidelink transmission that spans the multiple aggregated slots. The means for the second UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
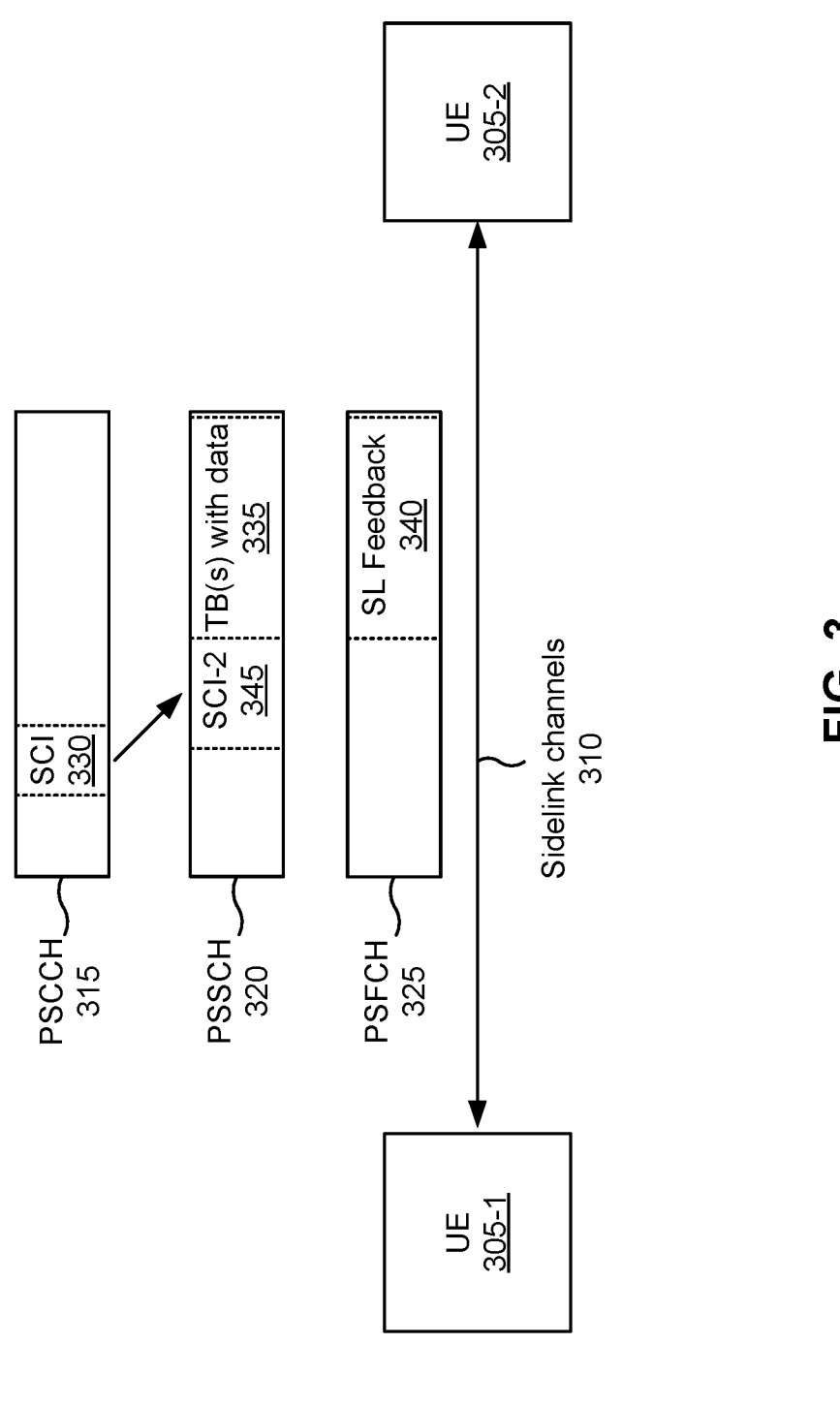
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-person (V2P) communications, and/or the like), mesh networking, and/or the like. The UEs 305 (e.g., UE 305-1 and/or UE 305-2) may correspond to one or more other UEs described elsewhere herein, such as UE 120. The one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

The one or more sidelink channels 310 may use resource pools. For example, a scheduling assignment (e.g., included in SCI 330) may be transmitted in sub-channels using specific resource blocks (RBs) across time. Data transmissions (e.g., on the PSSCH 320) associated with a scheduling assignment may occupy adjacent RBs in the same subframe as the scheduling assignment (e.g., using frequency division multiplexing). A scheduling assignment and associated data transmissions may not be transmitted on adjacent RBs.

A UE 305 may operate using a transmission mode where resource selection and/or scheduling is performed by the UE 305 (e.g., rather than a base station 110). The UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding configuration (MCS) to be used for the upcoming sidelink transmission, and/or the like. A UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

SCI 330 may include a first part and a second part, which may be referred to as SCI-1 and SCI-2, respectively. SCI-1 may be transmitted on a PSCCH. SCI-1 may include a resource allocation, and may include information for decoding SCI-2 (e.g., a format of SCI-2 and/or other information). The resource allocation may indicate resources for SCI-2 and/or a shared channel (SCH). SCI-2 may be transmitted on a PSSCH. SCI-2 may include information for decoding the SCH. SCI-1 and/or SCI-2 may be encoded and/or decoded using a physical downlink control channel (PDCCH) polar coding/decoding chain.

SCI-2 may be mapped to contiguous resource blocks (RBs) in the PSSCH, starting from a first symbol with a PSSCH demodulation reference signal (DMRS). SCI-2 may be scrambled separately from the SCH. SCI-2 may be modulated using quadrature phase shift keying (QPSK). Since the format of SCI-2 may be indicated by SCI-1, a recipient of SCI-2 may not perform blind decoding of SCI-2, thereby conserving computing resources.

In some aspects, as described elsewhere herein, the first UE 305-1 may transmit, to the second UE 305-2, a sidelink transmission (e.g., a PSSCH transmission) that spans multiple aggregated slots. A first symbol in a slot of the sidelink transmission may indicate information (e.g., redundancy information, duplicate information, or unique information) that enables the second UE 305-2 to decode the sidelink transmission.

As indicated above, FIG. 3 is provided as an example. Other examples may differ from what is described with respect to FIG. 3.

Figure 4:
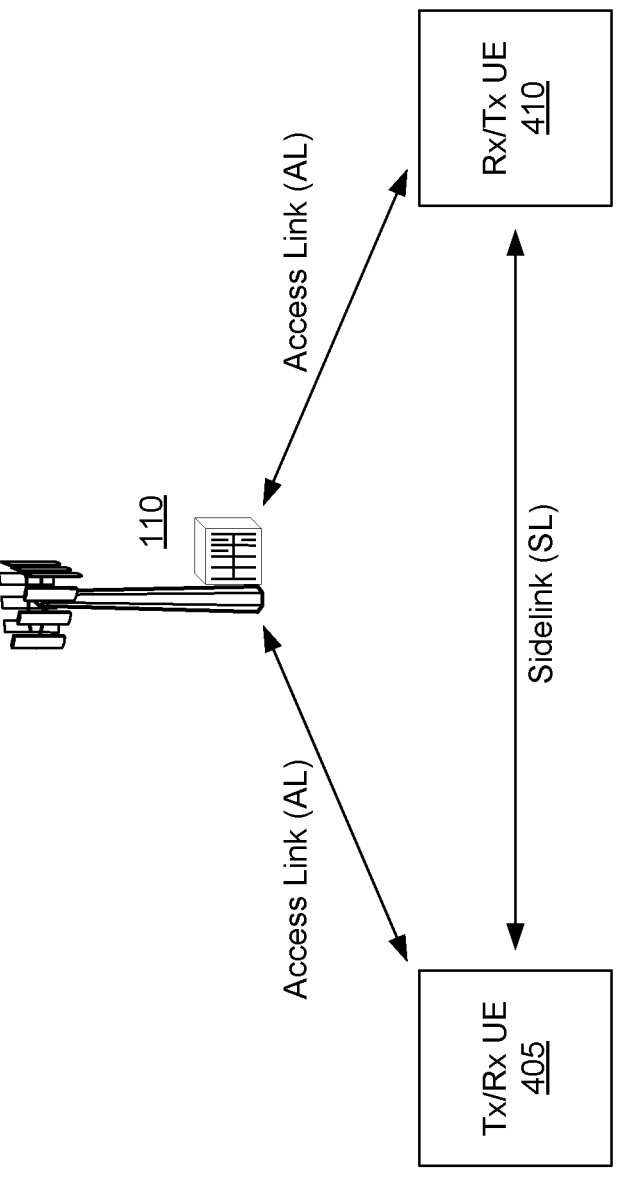
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, as described elsewhere herein, the Tx/Rx UE 405 may transmit, to the Rx/Tx UE 410, a sidelink transmission (e.g., a PSSCH transmission) that spans multiple aggregated slots. A first symbol in a slot of the sidelink transmission may indicate information (e.g., redundancy information, duplicate information, or unique information) that enables the Rx/Tx UE 410 to decode the sidelink transmission.

As indicated above, FIG. 4 is provided as an example. Other examples may differ from what is described with respect to FIG. 4.

In NR sidelink, a PSSCH transmission may be limited to within one slot. The NR sidelink may be configured to occupy fewer than 14 symbols in a slot. The PSSCH transmission may be associated with SCI-1 and SCI-2, which may result in a relatively high control overhead, especially for a relatively small allocation.

Alternatively, a PSSCH transmission may be performed using a slot aggregation. With slot aggregation, the PSSCH transmission may span multiple slots (or aggregated slots). The PSSCH transmission that uses slot aggregation may transmit more data per channel access (e.g., due to only a single listen-before-talk (LBT) being needed), as compared to a PSSCH transmission that is limited to a single slot, since a TB may span the multiple slots. Control overhead may be reduced in aggregated slots, since control information may only be present in a first slot of the PSSCH transmission that uses slot aggregation. Further, gap symbols between aggregated slots may be removed, which may enable increased data rates.

In a sidelink physical (PHY) structure, a quantity of OFDM that may be used for sidelink transmissions in a slot may be configured or pre-configured. In a first example, all symbols in a slot may be used for sidelink transmissions. For example, a first subset of symbols in the slot may be associated with PSCCH transmissions, and a second subset of symbols in the slot may be associated with PSSCH transmissions. In a second example, only a subset of symbols in a slot may be used for sidelink transmissions. For example, a first subset of symbols in the slot may be associated with PSCCH transmissions, a second subset of symbols in the slot may be associated with PSSCH transmissions, and a third subset of symbols in the slot may be associated with uplink transmissions.

Figure 5:
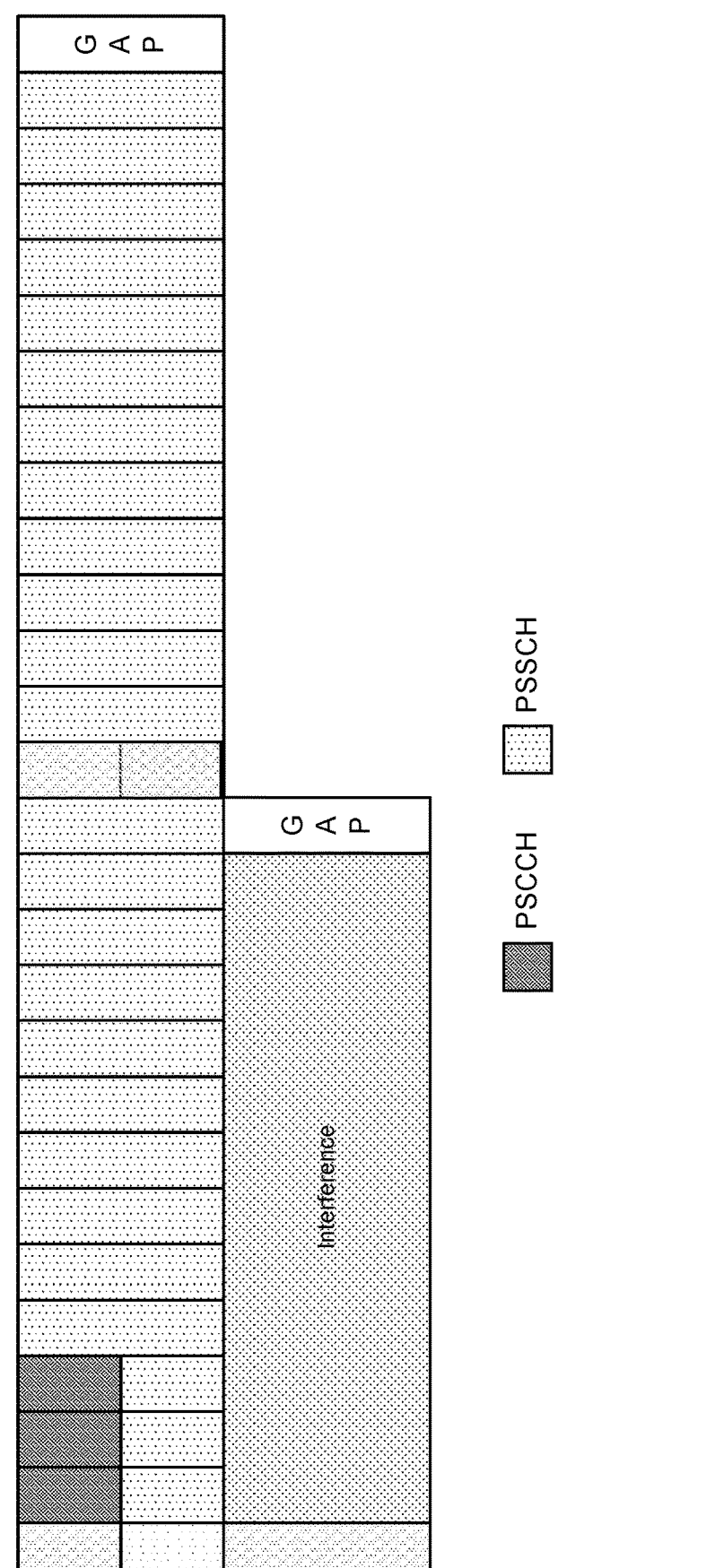
FIG. 5 is a diagram illustrating an example of sidelink communication interference, in accordance with the present disclosure.

FIG. 5 is a diagram illustrating an example 500 of sidelink communication interference, in accordance with the present disclosure.

As shown in FIG. 5, a PSCCH transmission may schedule a two-slot PSSCH transmission. The two-slot PSSCH transmission may span a first slot and a second slot. A first symbol of the two-slot PSSCH transmission may be associated with an automatic gain control (AGC) training. The two-slot PSSCH transmission may be from a same transmitter and may be associated with a same transmit power. In the first slot, but in a different set of resource blocks or sub-channels, a one-slot PSSCH transmission may occur, which may cause interference to the two-slot PSSCH transmission. The one-slot PSSCH transmission may occur during the first slot but not the second slot, or alternatively, the one-slot PSSCH transmission may occur during the second slot but not the first slot. A receiver that receives the two-slot PSSCH transmission may set its gain based at least in part on a received power associated with the first slot, where the first slot may be associated with both the two-slot PSSCH transmission and the one-slot PSSCH transmission. However, the second slot, which may correspond to the second part of the two-slot PSSCH transmission, may be associated with less received power since the one-slot PSSCH transmission only spans a single slot. As a result, different lengths of PSSCH transmissions due to slot aggregation may result in a variable received power across aggregated slots. The variable received power (or variable interference) may result in inaccurate AGC settings for other UEs, such that an impact of slot aggregation on the other UEs may need to be minimized.

As indicated above, FIG. 5 is provided as an example. Other examples may differ from what is described with respect to FIG. 5.

In various aspects of techniques and apparatuses described herein, a first UE may transmit, to a second UE, a sidelink transmission that spans multiple aggregated slots. A first symbol in a slot of the sidelink transmission may enable a decoding of the sidelink transmission by the second UE. The first symbol may include redundancy information that enables the decoding of other symbols of the sidelink transmission that spans the multiple aggregated slots. The first symbol may be a duplicate of a proceeding symbol (or succeeding symbol) of the sidelink transmission that spans the multiple aggregated slots. The first symbol may include unique information in relation to other symbols of the sidelink transmission that spans the multiple aggregated slots. Information, such as the redundancy information or the unique information, included in the first symbol in the slot of the sidelink transmission, as well as the first symbol being the duplicate of the proceeding symbol, may enable the second UE to decode the sidelink transmission that spans the multiple aggregated slots, even when the second UE is subjected to issues with AGC training due to variable received powers across aggregated slots. In other words, information included in the first symbol in the slot of the sidelink transmission may minimize an impact of the variable received powers across aggregated slots for the second UE.

Figure 6:
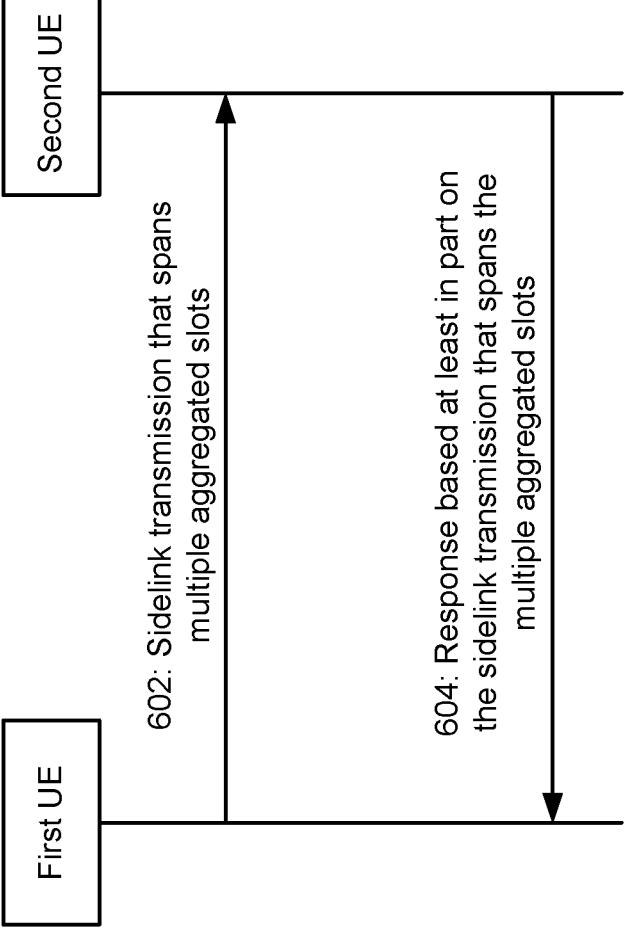
FIG. 6 is a diagram illustrating an example associated with sidelink transmissions using slot aggregation, in accordance with the present disclosure.

FIG. 6 is a diagram illustrating an example 600 associated with sidelink transmissions using slot aggregation, in accordance with the present disclosure. As shown in FIG. 6, example 600 includes communication between a first UE (e.g., UE 120a) and a second UE (e.g., UE 120e). In some aspects, the first UE and the second UE may be included in a wireless network, such as wireless network 100. In some aspects, the first UE and the second UE may communicate over a sidelink.

As shown by reference number 602, the first UE may transmit, to the second UE, a sidelink transmission that spans multiple aggregated slots. The sidelink transmission may be a PSSCH transmission that spans the multiple aggregated slots. A first symbol in a slot of the sidelink transmission may enable a decoding of the sidelink transmission by the second UE. For example, the first symbol may include information, such as redundancy information or unique information, that enables the decoding of the sidelink transmission by the second UE. Based at least in part on the information included in the first symbol, the second UE may be able to decode the sidelink transmission that spans the multiple aggregated slots, even when the second UE is subjected to interference from other UEs, such as the first UE.

In some aspects, the first symbol may include redundancy information that enables the decoding of other symbols of the sidelink transmission that spans the multiple aggregated slots. In some aspects, the first symbol may be a duplicate of a proceeding symbol (or succeeding symbol) of the sidelink transmission that spans the multiple aggregated slots. In some cases, the first symbol may include duplicate information of the proceeding symbol. In some aspects, the first symbol may include unique information in relation to other symbols of the sidelink transmission that spans the multiple aggregated slots.

In some aspects, a first OFDM symbol in an aggregated transmission (e.g., the sidelink transmission that spans the multiple aggregated slots) may be a duplicate of a proceeding symbol, which may be for AGC training. In some aspects, the first OFDM symbol in each slot of the aggregated transmission may include additional redundancy information to decode information in other symbols. The redundancy information may be based at least in part on a rate matching or an outer code. In some aspects, the first OFDM symbol in each slot of the aggregated transmission may be a duplicate of the proceeding symbol, where the first OFDM symbol may be used for AGC training. In some aspects, the first OFDM symbol may contain unique information, as in the case for other symbols. Thus, the first OFDM symbol may include information that enables the second UE to decode the aggregated transmission, even when the second UE is subjected to interference from other UEs, such as the first UE. In some cases, the information that enables the second UE to decode the aggregated transmission may not be present in a first OFDM symbol of a first slot of the aggregated transmission, but may be present in first OFDM symbols of subsequent slots of the aggregated transmission.

In some aspects, the first UE may determine that the first symbol includes the redundancy information, the first symbol is the duplicate of the proceeding symbol, or that the first symbol includes the unique information based at least in part on a resource pool pre-configuration or a resource pool configuration. The UE may determine the first OFDM symbol based at least in part on a resource pool pre-configuration (or resource pool configuration).

In some aspects, the first UE may receive, from the second UE, control signaling. The control signaling may include SCI. The first UE may determine that the first symbol includes the redundancy information, the first symbol is the duplicate of the proceeding symbol, or that the first symbol includes the unique information based at least in part on the control signaling. The first UE may determine the first OFDM symbol based at least in part on the control signaling, such as SCI-1 or SCI-2.

In some aspects, the first UE may determine that the first symbol includes the redundancy information, the first symbol is the duplicate of the proceeding symbol, or that the first symbol includes the unique information based at least in part on an allocation size. The allocation size may correspond to an entire resource pool bandwidth, or the allocation size may correspond to a portion of a resource pool bandwidth. The first UE may determine the first OFDM symbol based at least in part on the allocation size. For example, the first UE may determine that the first OFDM symbol indicates the unique information when an allocation spans the entire resource pool bandwidth, or the first UE may determine that the first OFDM symbol indicates the redundancy information or the duplicate information when the allocation does not span the entire resource pool bandwidth.

In some aspects, the first UE may determine that the first symbol includes the redundancy information, the first symbol is the duplicate of the proceeding symbol, or that the first symbol includes the unique information based at least in part on the aggregated slots being consecutive in time, or based at least in part on the aggregated slots being non-consecutive in time. In other words, the first UE may determine the OFDM symbol based at least in part on whether or not the aggregated slots are consecutive in time.

In some aspects, the first UE may determine that the first symbol includes the redundancy information, the first symbol is the duplicate of the proceeding symbol, or that the first symbol includes the unique information based at least in part on whether one or more gap symbols are present between aggregated slots. The one or more gap symbols may be due to not all symbols in the slot being configured for sidelink. In some aspects, one gap symbol after a last PSSCH symbol may be replaced by a PSSCH symbol, which may be a replacement symbol. The replacement symbol may include the redundancy information or the unique information. In other words, one gap symbol may be repurposed to include the redundancy information or the unique information.

In some aspects, the first UE may transmit the sidelink transmission that spans the multiple aggregated slots based at least in part on the allocation size satisfying a bandwidth threshold. In one specific example, the first UE may transmit the sidelink transmission that spans the multiple aggregated slots based at least in part on the allocation size spanning an entire resource pool bandwidth. In some aspects, the first UE may only be allowed to use slot aggregation when a PSSCH allocation satisfies (e.g., is at or above) the bandwidth threshold. The bandwidth threshold may be configured, pre-configured, or specified for the first UE. In some cases, the slot aggregation may be limited to a PSSCH transmission that spans the entire resource pool. For example, slot aggregation may be possible only when the PSSCH transmission spans a plurality of sub-channels (e.g., all sub-channels) associated with a resource pool bandwidth.

In some aspects, the first UE may determine to allow or disallow sidelink transmissions that span multiple aggregated slots based at least in part on a system congestion, a transmission cast type, a transmission priority, a pre-configuration, a configuration, and/or a channel access type. Slot aggregation may be allowed or disallowed based at least in part on the system congestion, the transmission cast type (e.g., unicast, groupcast, or broadcast), the transmission priority, the pre-configuration, the configuration, and/or the channel access type (e.g., unlicensed, dedicated, or licensed).

As shown by reference number 604, the first UE may receive, from the second UE, a response based at least in part on the sidelink transmission that spans the multiple aggregated slots. The response may be an acknowledgement in response to the sidelink transmission that spans the multiple aggregated slots.

As indicated above, FIG. 6 is provided as an example. Other examples may differ from what is described with respect to FIG. 6.

Figure 7:
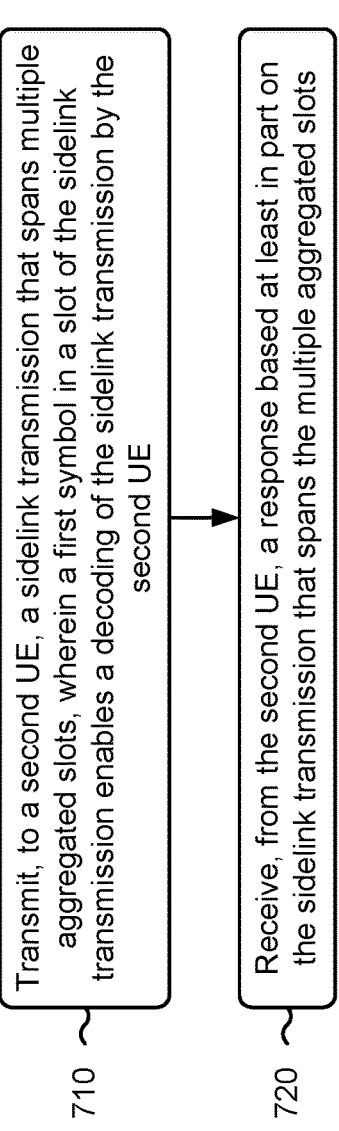
FIGS. 7-8 are diagrams illustrating example processes associated with sidelink transmissions using slot aggregation, in accordance with the present disclosure.

FIG. 7 is a diagram illustrating an example process 700 performed, for example, by a first UE, in accordance with the present disclosure. Example process 700 is an example where the first UE (e.g., UE 120a) performs operations associated with sidelink transmissions using slot aggregation.

As shown in FIG. 7, in some aspects, process 700 may include transmitting, to a second UE, a sidelink transmission that spans multiple aggregated slots, wherein a first symbol in a slot of the sidelink transmission enables a decoding of the sidelink transmission by the second UE (block 710). For example, the UE (e.g., using communication manager 140 and/or transmission component 904, depicted in FIG. 9) may transmit, to a second UE, a sidelink transmission that spans multiple aggregated slots, wherein a first symbol in a slot of the sidelink transmission enables a decoding of the sidelink transmission by the second UE, as described above.

As further shown in FIG. 7, in some aspects, process 700 may include receiving, from the second UE, a response based at least in part on the sidelink transmission that spans the multiple aggregated slots (block 720). For example, the UE (e.g., using communication manager 140 and/or reception component 902, depicted in FIG. 9) may receive, from the second UE, a response based at least in part on the sidelink transmission that spans the multiple aggregated slots, as described above.

Process 700 may include additional aspects, such as any single aspect or any combination of aspects described below and/or in connection with one or more other processes described elsewhere herein.

In a first aspect, the first symbol includes redundancy information that enables the decoding of other symbols of the sidelink transmission that spans the multiple aggregated slots.

In a second aspect, alone or in combination with the first aspect, the first symbol is a duplicate of a proceeding symbol of the sidelink transmission that spans the multiple aggregated slots.

In a third aspect, alone or in combination with one or more of the first and second aspects, the first symbol includes unique information in relation to other symbols of the sidelink transmission that spans the multiple aggregated slots.

In a fourth aspect, alone or in combination with one or more of the first through third aspects, process 700 includes determining a content or a type of the first symbol based at least in part on a resource pool pre-configuration or a resource pool configuration.

In a fifth aspect, alone or in combination with one or more of the first through fourth aspects, process 700 includes receiving control signaling from the second UE, wherein the control signaling includes sidelink control information, and determining information included in the first symbol based at least in part on the control signaling.

In a sixth aspect, alone or in combination with one or more of the first through fifth aspects, process 700 includes determining information included in the first symbol based at least in part on an allocation size, wherein the allocation size corresponds to an entire resource pool bandwidth, or the allocation size corresponds to a portion of a resource pool bandwidth.

In a seventh aspect, alone or in combination with one or more of the first through sixth aspects, process 700 includes determining information included in the first symbol based at least in part on the aggregated slots being consecutive in time.

In an eighth aspect, alone or in combination with one or more of the first through seventh aspects, process 700 includes determining information included in the first symbol based at least in part on the aggregated slots being non-consecutive in time.

In a ninth aspect, alone or in combination with one or more of the first through eighth aspects, transmitting the sidelink transmission that spans the multiple aggregated slots is based at least in part on an allocation size that satisfies a bandwidth threshold.

In a tenth aspect, alone or in combination with one or more of the first through ninth aspects, transmitting the sidelink transmission that spans the multiple aggregated slots is based at least in part on an allocation size that spans an entire resource pool bandwidth.

In an eleventh aspect, alone or in combination with one or more of the first through tenth aspects, process 700 includes determining to allow or disallow sidelink transmissions that span multiple aggregated slots based at least in part on one or more of: a system congestion, a transmission cast type, a transmission priority, a pre-configuration, a configuration, or a channel access type.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
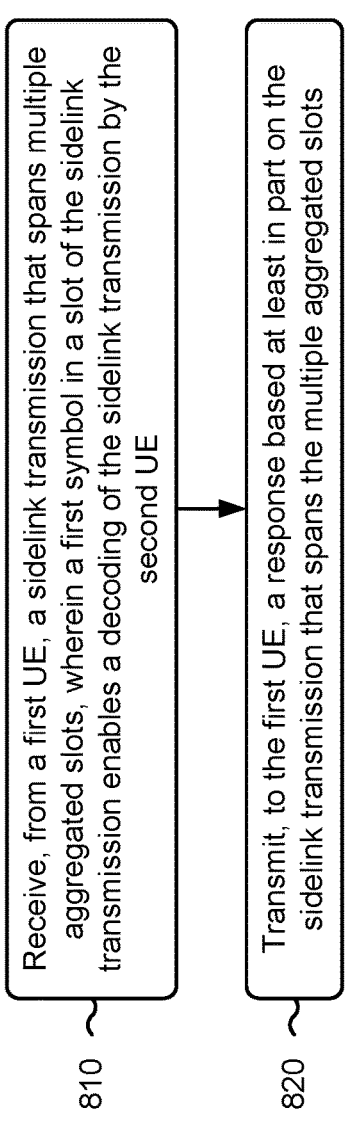

FIG. 8 is a diagram illustrating an example process 800 performed, for example, by a second UE, in accordance with the present disclosure. Example process 800 is an example where the second UE (e.g., UE 120e) performs operations associated with sidelink transmissions using slot aggregation.

As shown in FIG. 8, in some aspects, process 800 may include receiving, from a first UE, a sidelink transmission that spans multiple aggregated slots, wherein a first symbol in a slot of the sidelink transmission enables a decoding of the sidelink transmission by the second UE (block 810). For example, the UE (e.g., using reception component 1002, depicted in FIG. 10) may receive, from a first UE, a sidelink transmission that spans multiple aggregated slots, wherein a first symbol in a slot of the sidelink transmission enables a decoding of the sidelink transmission by the second UE, as described above.

As further shown in FIG. 8, in some aspects, process 800 may include transmitting, to the first UE, a response based at least in part on the sidelink transmission that spans the multiple aggregated slots (block 820). For example, the UE (e.g., using transmission component 1004, depicted in FIG. 10) may transmit, to the first UE, a response based at least in part on the sidelink transmission that spans the multiple aggregated slots, as described above.

Process 800 may include additional aspects, such as any single aspect or any combination of aspects described below and/or in connection with one or more other processes described elsewhere herein.

In a first aspect, the first symbol includes redundancy information that enables the decoding of other symbols of the sidelink transmission that spans the multiple aggregated slots; the first symbol is a duplicate of a proceeding symbol of the sidelink transmission that spans the multiple aggregated slots; or the first symbol includes unique information in relation to other symbols of the sidelink transmission that spans the multiple aggregated slots.

In a second aspect, alone or in combination with the first aspect, information included in the first symbol is based at least in part on one or more of: a resource pool pre-configuration or a resource pool configuration; controlling signaling transmitted by the second UE, wherein the control signaling includes sidelink control information; an allocation size, wherein the allocation size corresponds to an entire resource pool bandwidth, or the allocation size corresponds to a portion of a resource pool bandwidth; or the aggregated slots being consecutive in time or non-consecutive in time.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
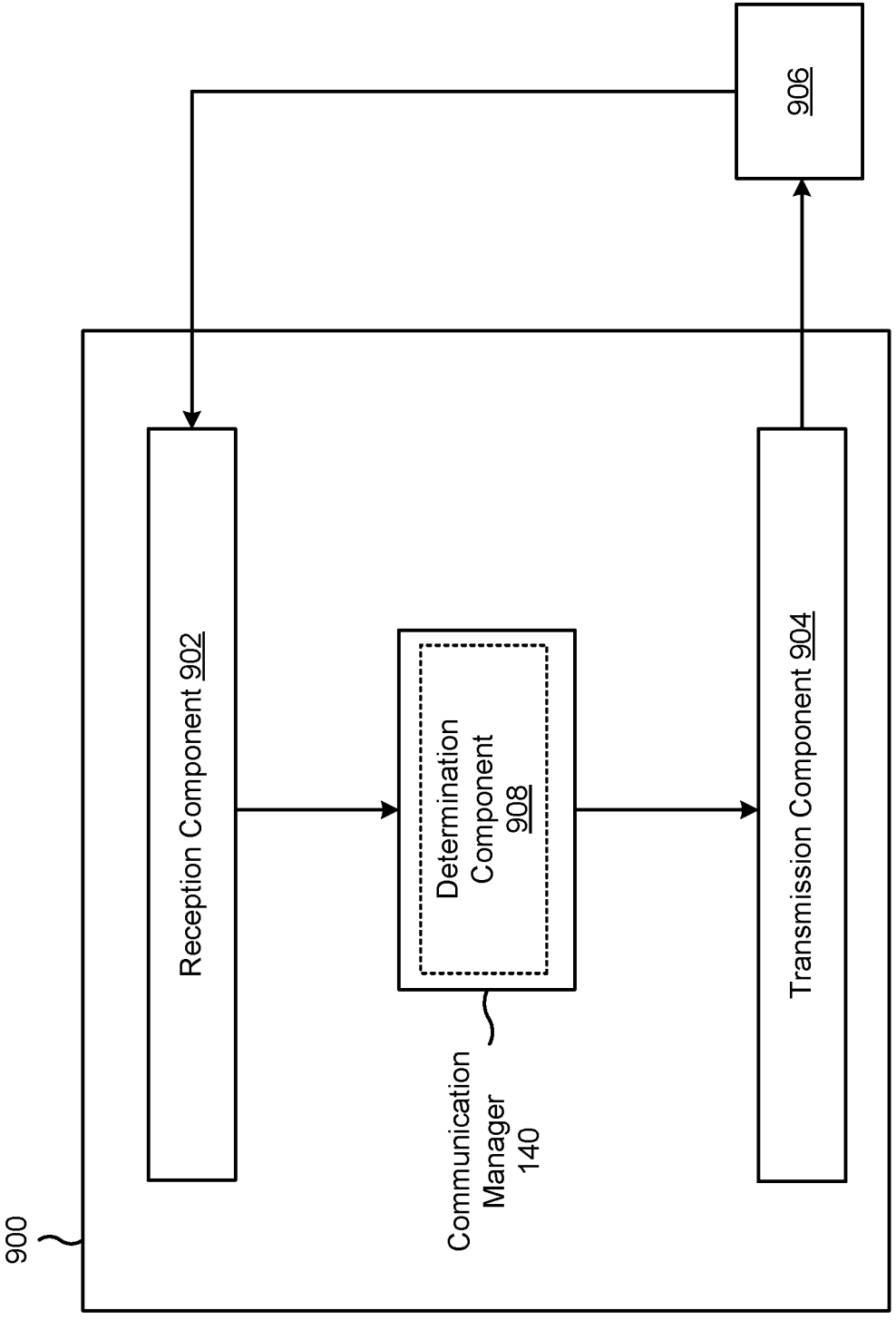
FIG. 9-10 are diagrams of example apparatuses for wireless communication, in accordance with the present disclosure.

FIG. 9 is a diagram of an example apparatus 900 for wireless communication. The apparatus 900 may be a first UE, or a first UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a determination component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the first UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the first UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the first UE described in connection with FIG. 2. In some aspects, the transmission component 904 may be co-located with the reception component 902 in a transceiver.

The transmission component 904 may transmit, to a second UE, a sidelink transmission that spans multiple aggregated slots, wherein a first symbol in a slot of the sidelink transmission enables a decoding of the sidelink transmission by the second UE. The reception component 902 may receive, from the second UE, a response based at least in part on the sidelink transmission that spans the multiple aggregated slots.

The determination component 908 may determine information included in the first symbol based at least in part on a resource pool pre-configuration or a resource pool configuration. The reception component 902 may receive control signaling from the second UE, wherein the control signaling includes sidelink control information. The determination component 908 may determine information included in the first symbol based at least in part on the control signaling.

The determination component 908 may determine information included in the first symbol based at least in part on an allocation size, wherein the allocation size corresponds to an entire resource pool bandwidth, or the allocation size corresponds to a portion of a resource pool bandwidth. The determination component 908 may determine information included in the first symbol based at least in part on the aggregated slots being consecutive in time. The determination component 908 may determine information included in the first symbol based at least in part on the aggregated slots being non-consecutive in time. The determination component 908 may determine to allow or disallow sidelink transmissions that span multiple aggregated slots based at least in part on one or more of: a system congestion, a transmission cast type, a transmission priority, a pre-configuration, a configuration, or a channel access type.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
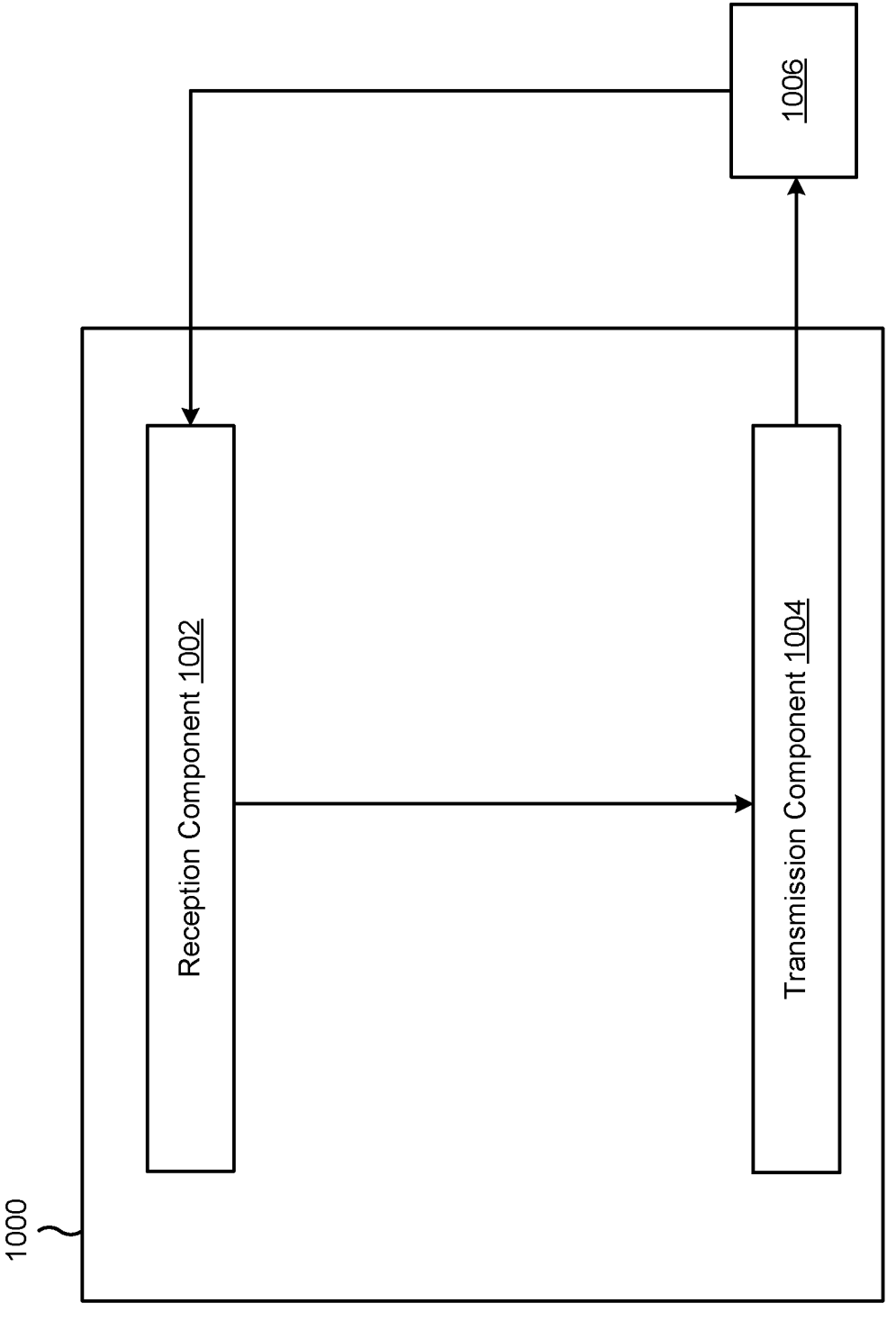

FIG. 10 is a diagram of an example apparatus 1000 for wireless communication. The apparatus 1000 may be a second UE, or a second UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the second UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the second UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the second UE described in connection with FIG. 2. In some aspects, the transmission component 1004 may be co-located with the reception component 1002 in a transceiver.

The reception component 1002 may receive, from a first UE, a sidelink transmission that spans multiple aggregated slots, wherein a first symbol in a slot of the sidelink transmission enables a decoding of the sidelink transmission by the second UE. The transmission component 1004 may transmit, to the first UE, a response based at least in part on the sidelink transmission that spans the multiple aggregated slots.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first user equipment (UE), comprising: transmitting, to a second UE, a sidelink transmission that spans multiple aggregated slots, wherein a first symbol in a slot of the sidelink transmission enables a decoding of the sidelink transmission by the second UE; and receiving, from the second UE, a response based at least in part on the sidelink transmission that spans the multiple aggregated slots.

Aspect 2: The method of Aspect 1, wherein the first symbol includes redundancy information that enables the decoding of other symbols of the sidelink transmission that spans the multiple aggregated slots.

Aspect 3: The method of any of Aspects 1 through 2, wherein the first symbol is a duplicate of a proceeding symbol of the sidelink transmission that spans the multiple aggregated slots.

Aspect 4: The method of any of Aspects 1 through 3, wherein the first symbol includes unique information in relation to other symbols of the sidelink transmission that spans the multiple aggregated slots.

Aspect 5: The method of any of Aspects 1 through 4, further comprising determining information included in the first symbol based at least in part on a resource pool pre-configuration or a resource pool configuration.

Aspect 6: The method of any of Aspects 1 through 5, further comprising: receiving control signaling from the second UE, wherein the control signaling includes sidelink control information; and determining information included in the first symbol based at least in part on the control signaling.

Aspect 7: The method of any of Aspects 1 through 6, further comprising determining information included in the first symbol based at least in part on an allocation size, wherein the allocation size corresponds to an entire resource pool bandwidth, or the allocation size corresponds to a portion of a resource pool bandwidth.

Aspect 8: The method of any of Aspects 1 through 7, further comprising determining information included in the first symbol based at least in part on the aggregated slots being consecutive in time.

Aspect 9: The method of any of Aspects 1 through 8, further comprising determining information included in the first symbol based at least in part on the aggregated slots being non-consecutive in time.

Aspect 10: The method of any of Aspects 1 through 9, wherein transmitting the sidelink transmission that spans the multiple aggregated slots is based at least in part on an allocation size that satisfies a bandwidth threshold.

Aspect 11: The method of any of Aspects 1 through 10, wherein transmitting the sidelink transmission that spans the multiple aggregated slots is based at least in part on an allocation size that spans an entire resource pool bandwidth.

Aspect 12: The method of any of Aspects 1 through 11, further comprising: determining to allow or disallow sidelink transmissions that span multiple aggregated slots based at least in part on one or more of: a system congestion, a transmission cast type, a transmission priority, a pre-configuration, a configuration, or a channel access type.

Aspect 13: A method of wireless communication performed by a second user equipment (UE), comprising: receiving, from a first UE, a sidelink transmission that spans multiple aggregated slots, wherein a first symbol in a slot of the sidelink transmission enables a decoding of the sidelink transmission by the second UE; and transmitting, to the first UE, a response based at least in part on the sidelink transmission that spans the multiple aggregated slots.

Aspect 14: The method of Aspect 13, wherein the first symbol includes redundancy information that enables the decoding of other symbols of the sidelink transmission that spans the multiple aggregated slots; the first symbol is a duplicate of a proceeding symbol of the sidelink transmission that spans the multiple aggregated slots; or the first symbol includes unique information in relation to other symbols of the sidelink transmission that spans the multiple aggregated slots.

Aspect 15: The method of any of Aspects 13 through 14, wherein information included in the first symbol is based at least in part on one or more of: a resource pool pre-configuration or a resource pool configuration; control signaling transmitted by the second UE, wherein the control signaling includes sidelink control information; an allocation size, wherein the allocation size corresponds to an entire resource pool bandwidth, or the allocation size corresponds to a portion of a resource pool bandwidth; or the aggregated slots being consecutive in time or non-consecutive in time.

Aspect 16: An apparatus for wireless communication at a device, comprising a processor; memory coupled with the processor; and instructions stored in the memory and executable by the processor to cause the apparatus to perform the method of one or more of Aspects 1-12.

Aspect 17: A device for wireless communication, comprising a memory and one or more processors coupled to the memory, the one or more processors configured to perform the method of one or more of Aspects 1-12.

Aspect 18: An apparatus for wireless communication, comprising at least one means for performing the method of one or more of Aspects 1-12.

Aspect 19: A non-transitory computer-readable medium storing code for wireless communication, the code comprising instructions executable by a processor to perform the method of one or more of Aspects 1-12.

Aspect 20: A non-transitory computer-readable medium storing a set of instructions for wireless communication, the set of instructions comprising one or more instructions that, when executed by one or more processors of a device, cause the device to perform the method of one or more of Aspects 1-12.

Aspect 21: An apparatus for wireless communication at a device, comprising a processor; memory coupled with the processor; and instructions stored in the memory and executable by the processor to cause the apparatus to perform the method of one or more of Aspects 13-15.

Aspect 22: A device for wireless communication, comprising a memory and one or more processors coupled to the memory, the one or more processors configured to perform the method of one or more of Aspects 13-15.

Aspect 23: An apparatus for wireless communication, comprising at least one means for performing the method of one or more of Aspects 13-15.

Aspect 24: A non-transitory computer-readable medium storing code for wireless communication, the code comprising instructions executable by a processor to perform the method of one or more of Aspects 13-15.

Aspect 25: A non-transitory computer-readable medium storing a set of instructions for wireless communication, the set of instructions comprising one or more instructions that, when executed by one or more processors of a device, cause the device to perform the method of one or more of Aspects 13-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
  a memory; and
  one or more processors, coupled to the memory, configured to:
    transmit, to a second UE, a sidelink transmission that spans multiple aggregated slots, wherein a first symbol in a slot of the sidelink transmission enables a decoding of the sidelink transmission by the second UE, and wherein a gap symbol between the multiple aggregated slots is replaced by a physical sidelink shared channel (PSSCH) symbol that includes redundancy information or unique information; and
    receive, from the second UE, a response based at least in part on the sidelink transmission that spans the multiple aggregated slots, wherein the first UE is allowed to use slot aggregation based at least in part on a PSSCH bandwidth allocation size being greater than or equal to a bandwidth threshold.

2. The apparatus of claim 1, wherein the redundancy information enables the decoding of other symbols of the sidelink transmission that spans the multiple aggregated slots.

3. The apparatus of claim 1, wherein the first symbol is a duplicate of a proceeding symbol of the sidelink transmission that spans the multiple aggregated slots.

4. The apparatus of claim 1, wherein the unique information includes unique information in relation to other symbols of the sidelink transmission that spans the multiple aggregated slots.

5. The apparatus of claim 1, wherein the one or more processors are further configured to determine a content or a type of the first symbol based at least in part on a resource pool pre-configuration or a resource pool configuration.

6. The apparatus of claim 1, wherein the one or more processors are further configured to:
  receive control signaling from the second UE, wherein the control signaling includes sidelink control information; and
  determine information included in the first symbol based at least in part on the control signaling.

7. The apparatus of claim 1, wherein the one or more processors are further configured to determine information included in the first symbol based at least in part on an allocation size, wherein the allocation size corresponds to an entire resource pool bandwidth, or the allocation size corresponds to a portion of a resource pool bandwidth, wherein the allocation size comprises the PSSCH bandwidth allocation size.

8. The apparatus of claim 1, wherein the one or more processors are further configured to determine information included in the first symbol based at least in part on the multiple aggregated slots being consecutive in time.

9. The apparatus of claim 1, wherein the one or more processors are further configured to determine information included in the first symbol based at least in part on the multiple aggregated slots being non-consecutive in time.

10. The apparatus of claim 1, wherein transmitting the sidelink transmission that spans the multiple aggregated slots is based at least in part on an allocation size that is greater than or equal to the bandwidth threshold, wherein the allocation size comprises the PSSCH bandwidth allocation size.

11. The apparatus of claim 1, wherein transmitting the sidelink transmission that spans the multiple aggregated slots is based at least in part on an allocation size that spans an entire resource pool bandwidth, wherein the allocation size that spans the entire resource pool bandwidth comprises the PSSCH bandwidth allocation size.

12. The apparatus of claim 1, wherein the one or more processors are further configured to:
  determine to allow or disallow sidelink transmissions that span multiple aggregated slots based at least in part on one or more of: a system congestion, a transmission cast type, a transmission priority, a pre-configuration, a configuration, or a channel access type.

13. An apparatus for wireless communication at a second user equipment (UE), comprising:
  a memory; and
  one or more processors, coupled to the memory, configured to:
    receive, from a first UE, a sidelink transmission that spans multiple aggregated slots, wherein a first symbol in a slot of the sidelink transmission enables a decoding of the sidelink transmission by the second UE, and wherein a gap symbol between the multiple aggregated slots is replaced by a physical sidelink shared channel (PSSCH) symbol that includes redundancy information or unique information; and transmit, to the first UE, a response based at least in part on the sidelink transmission that spans the multiple aggregated slots, wherein slot aggregation is allowed based at least in part on a PSSCH bandwidth allocation size being greater than or equal to a bandwidth threshold.

14. The apparatus of claim 13, wherein:

the redundancy information enables the decoding of other symbols of the sidelink transmission that spans the multiple aggregated slots;

the first symbol is a duplicate of a proceeding symbol of the sidelink transmission that spans the multiple aggregated slots; or the unique information comprises unique information in relation to the other symbols of the sidelink transmission that spans the multiple aggregated slots.

15. The apparatus of claim 13, wherein information included in the first symbol is based at least in part on one or more of:

a resource pool pre-configuration or a resource pool configuration;

control signaling transmitted by the second UE, wherein the control signaling includes sidelink control information;

an allocation size, wherein the allocation size corresponds to an entire resource pool bandwidth, or the allocation size corresponds to a portion of a resource pool bandwidth, and wherein the allocation size comprises the PSSCH bandwidth allocation size; or the multiple aggregated slots being consecutive in time or non-consecutive in time.

16. A method of wireless communication performed by a first user equipment (UE), comprising:

transmitting, to a second UE, a sidelink transmission that spans multiple aggregated slots, wherein a first symbol in a slot of the sidelink transmission enables a decoding of the sidelink transmission by the second UE, and wherein a gap symbol between the multiple aggregated slots is replaced by a physical sidelink shared channel (PSSCH) symbol that includes redundancy information or unique information; and receiving, from the second UE, a response based at least in part on the sidelink transmission that spans the multiple aggregated slots, wherein the first UE is allowed to use slot aggregation based at least in part on a PSSCH bandwidth allocation size being greater than or equal to a bandwidth threshold.

17. The method of claim 16, wherein the redundancy information enables the decoding of other symbols of the sidelink transmission that spans the multiple aggregated slots.

18. The method of claim 16, wherein the first symbol is a duplicate of a proceeding symbol of the sidelink transmission that spans the multiple aggregated slots.

19. The method of claim 16, wherein the unique information includes unique information in relation to other symbols of the sidelink transmission that spans the multiple aggregated slots.

20. The method of claim 16, further comprising:

determining a content or a type of the first symbol based at least in part on a resource pool pre-configuration or a resource pool configuration.

21. The method of claim 16, further comprising:

receiving control signaling from the second UE, wherein the control signaling includes sidelink control information; and determining information included in the first symbol based at least in part on the control signaling.

22. The method of claim 16, further comprising:

determining information included in the first symbol based at least in part on an allocation size, wherein the allocation size corresponds to an entire resource pool bandwidth, or the allocation size corresponds to a portion of a resource pool bandwidth, wherein the allocation size comprises the PSSCH bandwidth allocation size.

23. The method of claim 16, further comprising:

determining information included in the first symbol based at least in part on the multiple aggregated slots being consecutive in time.

24. The method of claim 16, further comprising:

determining information included in the first symbol based at least in part on the multiple aggregated slots being non-consecutive in time.

25. The method of claim 16, wherein transmitting the sidelink transmission that spans the multiple aggregated slots is based at least in part on an allocation size that is greater than or equal to the bandwidth threshold, wherein the allocation size that is greater than or equal to the bandwidth threshold comprises the PSSCH bandwidth allocation size.

26. The method of claim 16, wherein transmitting the sidelink transmission that spans the multiple aggregated slots is based at least in part on an allocation size that spans an entire resource pool bandwidth, wherein the allocation size that spans the entire resource pool bandwidth comprises the PSSCH bandwidth allocation size.

27. The method of claim 16, further comprising:

determining to allow or disallow sidelink transmissions that span multiple aggregated slots based at least in part on one or more of: a system congestion, a transmission cast type, a transmission priority, a pre-configuration, a configuration, or a channel access type.

28. A method of wireless communication performed by a second user equipment (UE), comprising:

receiving, from a first UE, a sidelink transmission that spans multiple aggregated slots, wherein a first symbol in a slot of the sidelink transmission enables a decoding of the sidelink transmission by the second UE, and wherein a gap symbol between the multiple aggregated slots is replaced by a physical sidelink shared channel (PSSCH) symbol that includes redundancy information or unique information; and transmitting, to the first UE, a response based at least in part on the sidelink transmission that spans the multiple aggregated slots, wherein slot aggregation is allowed based at least in part on a PSSCH bandwidth allocation size being greater than or equal to a bandwidth threshold.

29. The method of claim 28, wherein:

the redundancy information enables the decoding of other symbols of the sidelink transmission that spans the multiple aggregated slots;

the first symbol is a duplicate of a proceeding symbol of the sidelink transmission that spans the multiple aggregated slots; or the unique information includes unique information in relation to the other symbols of the sidelink transmission that spans the multiple aggregated slots.

30. The method of claim 28, wherein information included in the first symbol is based at least in part on one or more of:

a resource pool pre-configuration or a resource pool configuration;

control signaling transmitted by the second UE, wherein the control signaling includes sidelink control information;

an allocation size, wherein the allocation size corresponds to an entire resource pool bandwidth, or the allocation size corresponds to a portion of a resource pool bandwidth, wherein the allocation size comprises the PSSCH bandwidth allocation size; or the multiple aggregated slots being consecutive in time or non-consecutive in time.

\* \* \* \* \*